Sept. 18, 1934.   T. M. KNOWLAND   1,973,904
METHOD OF MAKING SPONGE RUBBER COATED FABRIC
Filed Jan. 5, 1933
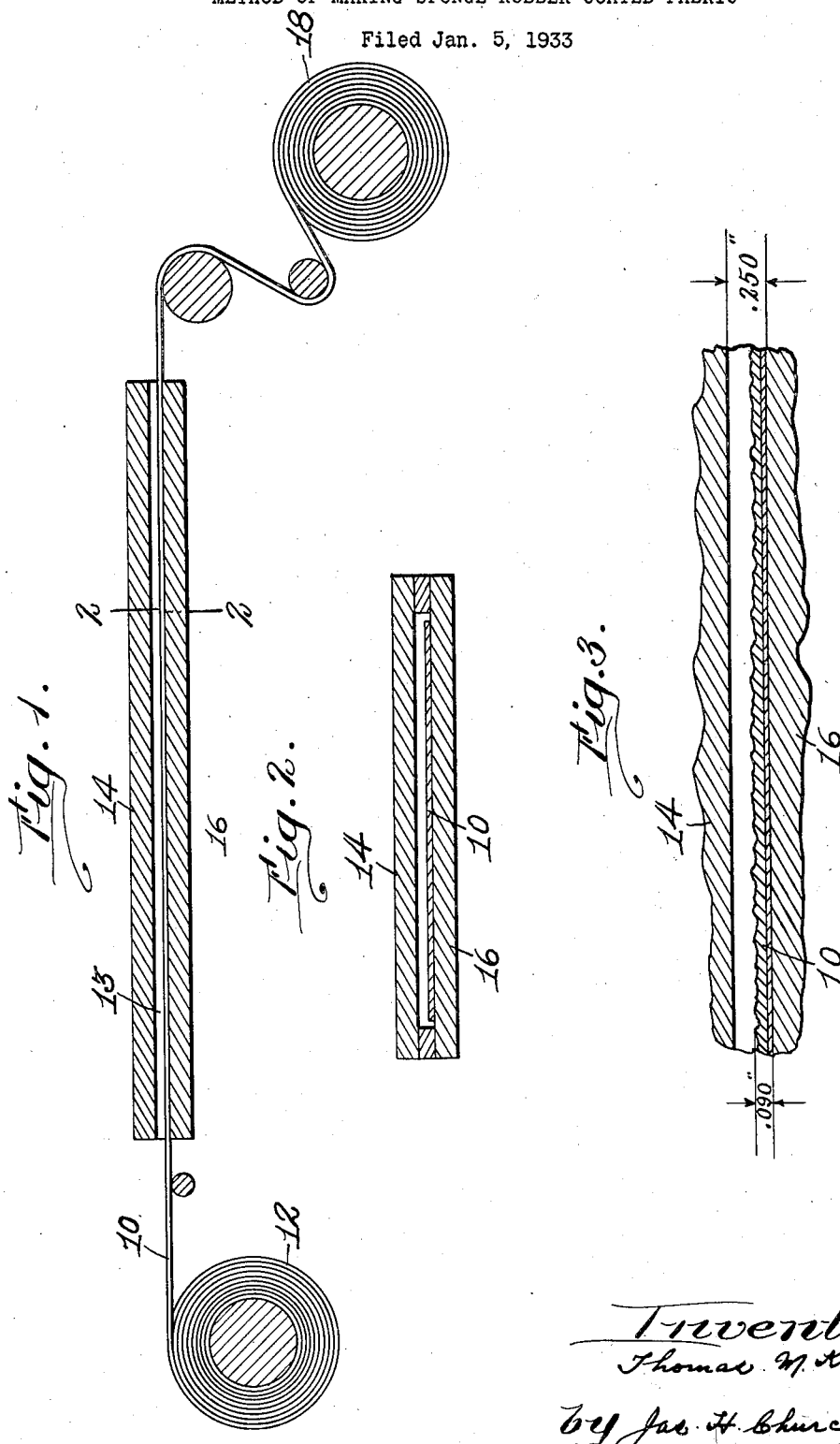

Patented Sept. 18, 1934

1,973,904

UNITED STATES PATENT OFFICE 1,973,904

METHOD OF MAKING SPONGE RUBBER COATED FABRIC

Thomas M. Knowland, Watertown, Mass., assignor to Boston Woven Hose & Rubber Company, Cambridge, Mass., a corporation of Massachusetts Application January 5, 1933, Serial No. 650,297

5 Claims. (Cl. 91—68)

This invention relates to a method of making a sponge rubber coated fabric, and particularly to one of the character at present known as a rug gripper.

The object of the invention is to provide a novel and improved method of making a sponge rubber coated fabric by which an improved and more uniform product may be produced in a more economical and rapid manner than by other methods of which I am aware.

With this general object in view, the invention consists in the method of making a sponge rubber coated fabric, and particularly a rug gripper, and in the steps in such a method, hereinafter described and particularly pointed out in the claims at the end of this specification.

In the drawing illustrating the preferred apparatus for practicing the present method, Fig. 1 is a diagrammatic view in side elevation illustrating the heating and curing chamber and the mechanism for passing the uncured rubber coated fabric therethrough; Fig. 2 is a cross-sectional view on the line 2—2 of Fig. 1; and Fig. 3 is an enlarged detail in longitudinal section illustrating the disposition of the heating elements with relation to the coated fabric being heated.

In general, the present invention aims to provide a novel and improved method of producing sponge rubber coated fabrics, such as the sponge rubber coated fabric generally known in the trade and used as a rug gripper, and in accordance with the present method a fabric is coated upon one of its surfaces with a layer of any of the usual or preferred rubber compounds containing a blowing agent, now commonly used in the production of sponge rubber coated fabrics. After the application of the coating of rubber to one surface of the fabric, the fabric is introduced between, and preferably slowly passed between, a pair of heating elements. In accordance with the preferred method, the uncoated surface of the fabric is arranged to contact directly with one of the heating elements to enable heat to pass by conduction in a rapid manner into the coating of rubber, and the other heating element is disposed closely adjacent to but slightly spaced from the surface of the rubber coating whereby to effect the rapid transfer of heat by radiation into the rubber coating, and as a result the rubber coating may be thoroughly and rapidly heated in a uniform manner, enabling the blowing agent to form the desired gas to produce the sponge rubber at the desired period in the curing of the rubber coating to enable the production of a sponge rubber coated fabric of a maximum uniformity and quality, and in a most economical and rapid manner. In the application of the invention to a sponge rubber coated fabric of the character now used in the trade as a rug gripper between rugs or carpets and highly polished floors to prevent the rugs from slipping, the heating elements are preferably heated to a temperature in the neighborhood of 288° F. and the heating elements spaced a short distance apart, preferably about one quarter of an inch. The rubber coated fabric is preferably drawn between the heating elements with the uncoated surface in contact with one of the same and at a speed such as to subject the coated fabric to a curing operation for a period of approximately ten minutes.

Referring now to the drawing, which is stated illustrates the preferred apparatus for practicing the present invention, it will be understood that the fabric comprising the base of the sponge rubber coated fabric is first coated in the usual form of calender with any usual or preferred rubber compound containing any usual or preferred blowing agent, and the coated fabric is then wound into rolled form in accordance with the usual practice. The coated and uncured fabric 10 is then withdrawn from the roll 12 and passed through a heating and curling chamber 13 formed by upper and lower steam heated platens 14, 16, which are spaced apart a fraction of an inch and preferably about a quarter of an inch. The uncoated surface of the fabric is preferably arranged to be drawn in direct contact with the surface of the lower platen 16 so that heat may be transferred into the coating of rubber upon the fabric by conduction through the fabric. After passing through the chamber 13 the fabric is preferably wound on a wind-up roll 18 driven in a suitable manner, the provision may also be made for varying the rate of movement of the fabric by a suitable speed changing roll as illustrated, and inasmuch as the details of such wind-up and speed changing mechanisms are well-known and of themselves form no part of the present invention, further description is believed to be unnecessary. The rubber coating upon the surface of the fabric containing the blowing agent is subjected to heating by direct radiation from the closely superposed surface of the upper heating element or platen 14, and in producing a sponge rubber coated fabric suitable for use as a rug gripper, it has been found that by drawing the fabric through the chamber at a speed such that the fabric is exposed to the curing temperature for a period of substantially ten minutes, the production of a most satisfactory and extremely uniform product is insured, and one which in itself is a distinct improvement upon the similar products made in accordance with processes of the prior art. In practice it is preferred to subject the platens 14, 16 to steam pressures of approximately forty pounds, maintaining a temperature of substantially 288° F. As illustrated in the enlarged details in Fig. 3, the average thickness of the uncured sponge rubber coated fabric amounts to approximately 0.090 inches, and it has been found that by spacing the heating platens 14, 16, about 0.250 inches apart, the necessary heating of the rubber coating is obtained to enable the blowing agent to produce the gas at the most advantageous period in the curing of the rubber, to insure a most uniform and high quality product.

The utility of the present process is particularly apparent when comparison is made with the standard method by which sponge rubber coated fabrics such as those used for rug grippers are now commercially produced.

In the manufacture of a rug gripper of the sponge rubber type according to the practice employed prior to the present invention, a suitable fabric is first coated upon one of its surfaces with a vulcanizable rubber compound of suitable thickness. Previous to calendering the fabric may if desired be "spread" with a cement of special characteristics to aid in the adhesion of the calender coating to the fabric. The rubber compound employed has incorporated therein a blowing agent which reacts chemically during the process of vulcanization to produce the well-known porous or sponge effect in the rubber layer by the liberation of a gas, usually carbon dioxide. While various rubber compositions have been employed and various finishes secured, nevertheless it is extremely desirable for purposes of quality and appearance that the final product be as uniform as possible in texture. The texture of the sponge rubber layer is controlled to a large extent by the distribution, average size and uniformity of size of the gas bubbles produced in the rubber body during the vulcanization, together with the liberation of the gas at the proper period in the curing of the rubber. These factors depend to a large extent on the rate of transfer of heat into the rubber layer. If the transfer of heat is non-uniform in rate to the different portions of the rubber layer during the vulcanizing period, the finished fabric will vary in texture and appearance due to insufficient blowing in some of the portions or to excessive blowing in others. A frequent and typical result is the formation of very large blisters in some portions and the formation of comparatively flat spots in others.

The usual method which has heretofore been employed in vulcanizing the uncured rubber coated fabric during the production of the sponge rubber coated fabric has included the hanging or draping of the fabric in festoons in a hot air vulcanizer and the curing of the rubber by the hot circulated air, and because of the fact that vulcanization by this method takes place largely due to the action of the heat which is conducted into the rubber layer by the comparatively slow process of convection, the time required has varied from one to two hours for complete curing of the rubber, and opportunity is afforded for reaction of the blowing agent and the escape of the gases by diffusion before the actual vulcanization of the rubber has taken place. Furthermore, temperature distribution in this type of vulcanizer is extremely non-uniform due to pocketing or channeling of the heated air, all of which detract from the uniformity of the final product. In addition "bar" marks are formed in the rubber layer at the contact points between the supporting bars and the rubber layer, chiefly due to the weight of the festoons of the material and the slow transfer of heat.

In contra-distinction to the foregoing prior method, the present process is rapid, and during the passage of the coated fabric between the heating elements, a rapid transfer of heat takes place by direct conduction from the lower heating element and by radiation from the closely disposed upper heating element with the result that vulcanization and blowing proceeds at a rapid but uniform rate and the product is exeremely uniform throughout. The formation of "bar" marks is avoided and the process lends itself to continuous operation, enabling not only a superior product to be produced but substantial economies to be effected in the matter of labor and rejected material.

While the invention is preferably applied to a process for producing rug gripper, it will be understood that it may be employed for the production of various other sponge rubber coated fabrics.

Having thus described the invention, what is claimed is:—

1. The method of coating a fabric with sponge rubber having a rough porous surface, which comprises, continuously passing a fabric coated with uncured rubber containing a blowing agent between heated platens, applying heat to the fabric by contact with one of said platens, and applying heat to the surface of the rubber by radiation from the other of said platens by maintaining said surface adjacent to but out of contact therewith during the passage of the coated fabric between the platens, the rate of travel of said fabric between the platens and the temperature of the platens being such as to expand and vulcanize said rubber.

2. The method of coating a fabric with sponge rubber having a rough porous surface, which comprises, continuously passing a fabric coated with uncured rubber containing a blowing agent through a heating zone, applying heat to said fabric in said zone by contact with an elongated heated surface, and simultaneously applying heat to the surface of said rubber by radiation from a second elongated heated surface maintained adjacent but out of contact therewith during the passage of the coated fabric through said heating zone to provide for the formation of said rough surface, the rate of travel of said fabric in said zone, and the temperature of said heated surfaces being such as to expand and vulcanize said rubber.

3. The method of coating a fabric with sponge rubber having a rough porous surface which comprises, applying a coating of a vulcanizable rubber compound containing a blowing agent to one surface of the fabric, continuously passing the coated fabric between heated platens, applying heat to the fabric by contact with one of said platens, and applying heat to the surface of the rubber compound by radiation from the other of said platens by maintaining said surface adjacent to but out of contact therewith during the passage of the coated fabric between the platens, the rate of travel of said coated fabric between the platens and the temperature of the platens being such as to expand and vulcanize said rubber compound.

4. The method of coating a fabric with sponge rubber having a rough porous surface which comprises applying a coating of a vulcanizable rubber compound containing a blowing agent to one surface of a fabric, continuously passing the coated fabric through a heating zone, applying heat to said fabric in said zone by contact with an elongated heated surface, and simultaneously applying heat to the surface of said rubber compound by radiation from a second elongated heated surface maintained adjacent to but out of contact therewith during the passage of the coated fabric through the heating zone to provide for the formation of said rough surface, the rate of travel of said coated fabric through said zone and the temperature of said heated surfaces being such as to expand and vulcanize said rubber compound.

5. The method of coating a fabric with sponge rubber having a rough surface which comprises, continuously passing a fabric coated with a vulcanizable rubber compound containing a blowing agent through an elongated heating zone, applying heat to said fabric by contact with an elongated heated surface in said zone, simultaneously applying heat to the surface of said rubber compound by radiation in said zone from a second elongated heated surface maintained adjacent to but out of contact therewith during the passage of the coated fabric through the heating zone, maintaining the heated surfaces at a temperature in the neighborhood of 288° F., and moving the coated fabric at a rate such that the rubber compound is expanded and vulcanized during its passage through said heating zone.

THOMAS M. KNOWLAND.